United States Patent

[11] 3,589,225

| [72] | Inventor | James G. Wiatt |
| | | Cincinnati, Ohio |
| [21] | Appl. No. | 643,694 |
| [22] | Filed | June 5, 1967 |
| [45] | Patented | June 29, 1971 |
| [73] | Assignee | Cincinnati Milacron, Inc. |
| | | Cincinnati, Ohio |

[54] RECIPROCATING FOOT FOR USE WITH MATERIAL CUTTING MACHINE
5 Claims, 5 Drawing Figs.

[52] U.S. Cl............................................ 83/129,
83/375, 83/424, 83/427, 83/925
[51] Int. Cl......................................... B26d 7/02,
B26d 5/42
[50] Field of Search.......................................... 83/375,
452—454, 129, 130, 424, 427, 647, 385—389;
30/275

[56] References Cited
UNITED STATES PATENTS

| 1,815,018 | 7/1931 | Wagner.................... | 30/275 X |
| 1,856,175 | 5/1932 | Towle....................... | 83/129 X |
| 2,052,630 | 9/1936 | Hoskwith ................. | 83/387 X |
| 2,200,746 | 5/1940 | Hoskwith .................. | 30/275 |
| 3,470,780 | 10/1969 | Wright ...................... | 83/375 |

*Primary Examiner*—James M. Meister
*Attorney*—Frank C. Leach, Jr.

ABSTRACT: A material cutting machine has an electric motor for reciprocating a cutting blade to cut material during movement of the cutting blade in both vertical directions. The motor has a crank wheel mounted on its shaft and connected through suitable means to the cutting blade for producing the reciprocating motion. An eccentric, which is mounted on the shaft of the motor, has its center on one side of the longitudinal axis of the shaft and diametrically disposed to the connection of the means to the crank wheel. A follower has one end resiliently biased into engagement with the periphery of the eccentric while its other end is adjustably connected to a flat, circular plate, which is adapted to engage the top of the material being cut by the cutting blade. When the cutting blade is moved upwardly, the plate is moved downwardly into engagement with the material being cut to prevent lifting of the material being cut by the cutting blade during its upward movement. The connection between the follower and the plate is adjustable to accommodate various total thicknesses of the material being cut.

PATENTED JUN29 1971 3,589,225

INVENTOR.
JAMES G. WIATT
BY
Frank C. Leach Jr.
ATTORNEY

RECIPROCATING FOOT FOR USE WITH MATERIAL CUTTING MACHINE

In a material cutting machine of the type shown and described in the copending patent application of George W. Sederberg for "Material Cutting Machine Having Reciprocating Cutting Blade," Ser. No. 636,965, filed May 8, 1967, now abandoned, and assigned to the same assignee as the assignee of the present application, the material is cut during both the up and down movements of the cutting blade. While suitable holddown structure is utilized to prevent relative movement between the various layers of material being cut as shown and described in the copending patent application of James G. Wiatt and Edward C. Bruns for "Hold Down Apparatus For Material Cutting Machine," Ser. No. 636,968, filed May 8, 1967, now U.S. Pat. No. 3,499,355, and assigned to the same assignee as the assignee of the present application; this holddown structure is spaced slightly from the cutting blade. Accordingly, while the holddown structure of the aforesaid Wiatt et al. application satisfactorily prevents shifting of the layers of material during cutting, the upward cutting movement of the cutting blade of the aforesaid Sederberg application may tend to lift the material adjacent the cutting blade.

The present invention satisfactorily overcomes this problem by utilizing a holddown foot, which is moved downwardly into engagement with the material being cut during upward movement of a reciprocating cutting blade. Thus, the phase relationship between the cutting blade and the holddown foot is such that the holddown foot creates a force on the material during the upward cutting movement of the cutting blade to prevent the material, which is being cut, from lifting.

When the cutting blade is moving downwardly, there is little tendency for the material, which is being cut, to lift. Accordingly, during downward movement of the reciprocating cutting blade, the holddown foot of the present invention is moved upwardly to release its force on the material being cut. This eliminates any tendency for the holddown foot of the present invention to bunch or slide the material relative to the foot.

In some materials, the cutting force of the cutting blade may cause the material to tend to hump in addition to lifting. When the blade is just entering the material with only one of the holddown belts of the aforesaid Wiatt et al. application in contact with the material, humping of the material also may occur when the blade makes a sharp turn due to the width of the cutting blade. Due to the upward movement of the holddown foot of the present invention during downward movement of the cutting blade, the pressure of the holddown foot on the material is released so that humping of the material is prevented.

Humping of the material also may be created by air entering between the layers of material being cut. The downward movement of the holddown foot of the present invention prevents the air from building up within the layers of the material being cut. Thus, the holddown foot of the present invention not only prevents lifting of the material during upward movement of the cutting blade but also prevents humping of the material being cut.

An object of this invention is to provide a device to prevent material, which is being cut by reciprocating cutting means, from being lifted during upward cutting.

Another object of this invention is to provide a device to prevent any humping of the material being cut when the material comprises a plurality of layers of material.

Other objects of this invention will be readily perceived from the following description, claims, and drawing.

This invention relates to a material cutting machine comprising means to support material thereon for cutting and cutting means to cut the material supported on the material-supporting means. Means engages the top of the material to exert a downward force thereon. Means reciprocates the engaging means relative to the material during cutting of the material by the cutting means.

The attached drawing illustrates a preferred embodiment of the invention, in which.

Figure 1:
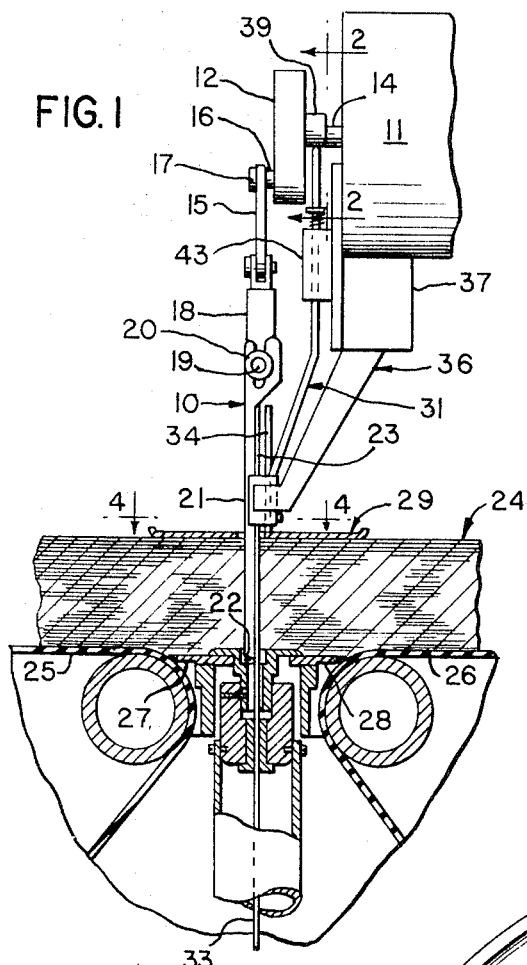
FIG. 1 is a side sectional view, partly in elevation, of a material cutting machine utilizing a holddown foot of the present invention.

Referring to the drawing and particularly FIG. 1, there are shown portions of a material cutting machine of the type more particularly shown and described in the aforesaid Sederberg application. The material cutting machine has a reciprocating cutting blade 10, which is adapted to be reciprocated by an electric motor 11. The motor 11 has a crank wheel 12 mounted on its shaft 14.

A connecting rod 15 is attached to a stud 16 on the crank wheel 12 and retained thereon by a nut 17, which cooperates with a threaded end of the stud 16. The lower end of the connecting rod 15 is pivotally connected to a slider 18 at its upper end. The lower end of the slider 18 is connected by a bolt 19 and nut 20 to the upper end of the cutting blade 10.

Accordingly, when the motor 11 rotates, the rotation of the crank wheel 12 causes the cutting blade 10 to reciprocate. Thus, each revolution of the motor 11 results in a complete upward and downward movement of the cutting blade 10.

The cutting blade 10 has its leading edge 21 and a bottom edge 22, which connects the bottom ends of the leading edge 21 and trailing edge 23, sharpened. Thus, as shown and described in the aforesaid Sederberg application, cutting of material 24, which may be a plurality of layers of cloth, for example, occurs during both upward and downward movements of the cutting blade 10.

As more particularly shown and described in the aforesaid Sederberg application, the material 24 is supported on endless bands 25 and 26 and throat way sections 27 and 28. The gap, which is formed between the throat way sections 27 and 28, may be closed as more particularly shown and described in the copending patent application of Edward C. Bruns for "Gap Closer For Material Cutting Machine," Ser. No. 636,964, filed May 8, 1967, and assigned to the same assignee as the assignee of the present application.

Figure 5:
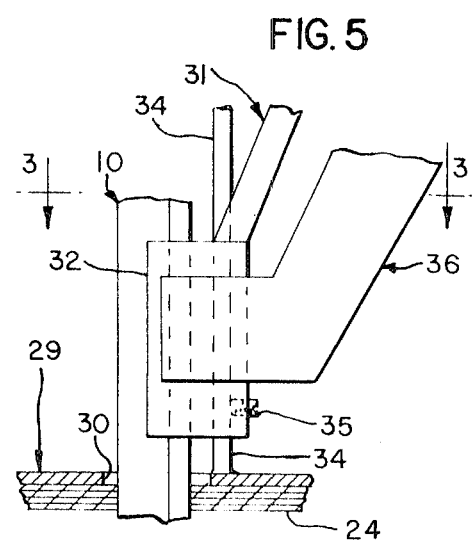
FIG. 5 is an enlarged side elevational view, partly in section, showing the relationship of the cutting blade, the holddown foot, and the connection of the support structure for the holddown foot to the holddown foot.
Figures 3, 4:
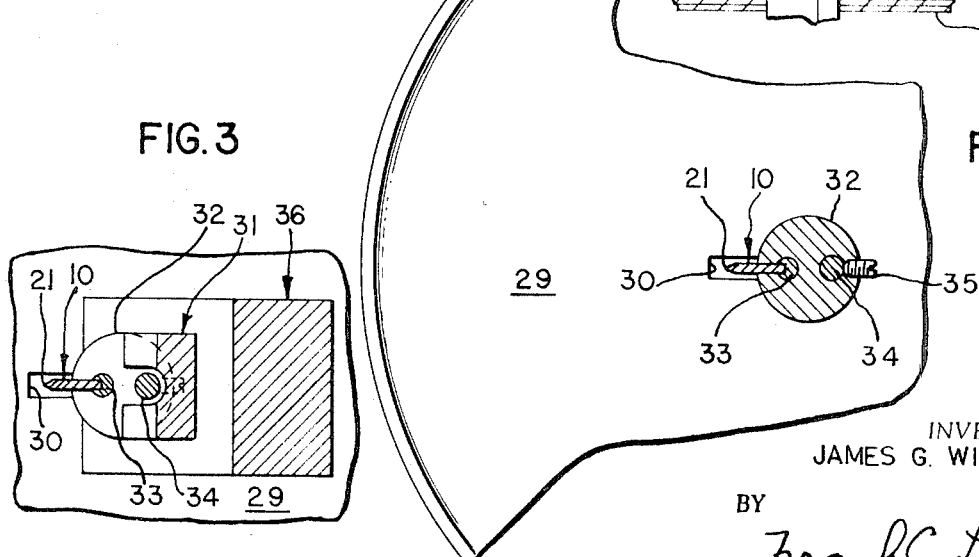
FIG. 3 is an enlarged sectional view, partly in plan, showing the relationship of the support structure for the holddown foot with respect to the cutting blade and taken along line 3-3 of FIG. 5.
FIG. 4 is an enlarged top plan view, partly in section, showing a portion of the holddown foot and its relation to the cutting blade and taken along line 4-4 of FIG. 1.

The holddown foot of the present invention is preferably a flat, circular plate 29. The flat, circular plate 29 has an opening 30 (see FIGS. 3—5) therein through which the cutting blade 10 extends.

The plate 29 is adjustably connected to a rod 31, which has an enlarged lower end 32 of cylindrical shape. The lower end 32 has a slot (see FIGS. 3 and 4) formed therein to accommodate the cutting blade 10 and its stiffening rod 33. As more particularly shown and described in the aforesaid Sederberg application, the rod 33 is fixed to the cutting blade 10 adjacent the trailing edge 23 to support the cutting blade 10.

The upper surface of the plate 29 has a rod 34 (see FIG. 5) extending upwardly therefrom and through a passage in the lower end 32 of the rod 31. The lower end 32 of the rod 31 has a threaded opening therein to receive a set screw 35. The set screw 35 is adapted to engage the rod 34 to lock the rod 34 to the rod 31. Accordingly, the position of the bottom surface of the plate 29 with respect to the material-supporting means may be adjusted in accordance with the total thickness of the material 24.

The lower end 32 of the rod 31 slides within a slot (see FIG. 3) formed in a support arm 36 to ensure that the lower end 32 of the rod 31 moves only in a vertical direction as does the cutting blade 10. The support arm 36 is fixedly secured to a portion 37 of a housing, which encloses the crank wheel 12, the connecting rod 15, the slider 18, and the upper portion of the rod 31.

The rod 31 has its upper end 38 (see FIG. 2) engaging the periphery of an eccentric 39, which is mounted on the shaft 14 of the motor 11. The upper end 38 of the rod 31 is maintained in engagement with the periphery of the eccentric 39 by a spring 40, which resiliently urges the upper end 38 of the rod 31 into engagement with the periphery of the eccentric 39 so that the upper end follows the movement of the eccentric 39.

Figure 2:
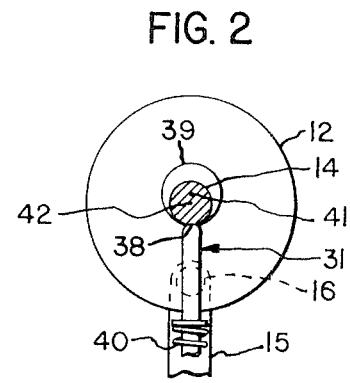
FIG. 2 is an enlarged sectional view, partly in elevation, showing the relationship between the eccentric and the connecting structure to the cutting blade with respect to the shaft of the motor and taken along line 2-2 of FIG. 1.

As shown in FIG. 2, the eccentric 39 has its center 41 mounted above longitudinal axis 42 of the shaft 14 when the stud 16 is disposed beneath the axis 42 of the shaft 14. Furthermore, the center 41 of the eccentric 39 is diametrically disposed to the stud 16 so that movement of the cutting blade 10 and the rod 31 are 180° out of phase with each other.

The rod 31 passes through a guide bushing 43 (see FIG. 1), which is mounted within the housing and fixedly secured to the portion 37 thereof. Thus, the support arm 36 and the guide bushing 43 cooperate to insure that the plate 29 moves only in a vertical direction.

Considering the operation of the present invention, the position of the plate 29 with respect to the plane of the material-supporting means on which the material 24 is to be supported is determined by the portion of the rod 34 engaged by the setscrew 35. Thus, when the total thickness of the material 24 is relatively small, the plate 29 will be disposed closest to the throat way sections 27 and 28. Likewise, when the total thickness of the material 24 is the largest, the plate 29 will be disposed the greatest distance from the throat way sections 27 and 28.

With the plate 29 properly positioned, it rests on the top of the material 24. When the motor 11 is energized, the plate 29 moves upwardly during the downward movement of the cutting blade 10, and the plate 29 moves downwardly when the cutting blade 10 moves upwardly. This is ensured due to the relation of the center 41 of the eccentric 39 with respect to the stud 16 on the crank wheel 12.

Thus, as soon as the cutting blade 10 begins to move upwardly, the plate 29 starts to move downwardly to exert a force on the material 24 to prevent it from being lifted during the cutting of the material 24 to prevent it from being lifted during the cutting of the material 24 by upward movement of the cutting blade 10. This downward force of the plate 29 continues until the cutting blade 10 starts to move downwardly. When this occurs, the plate 29 is lifted upwardly to release its force on the material 24.

The amplitude of the movement of the plate 29 is determined by the distance of the center 41 of the eccentric 39 from the longitudinal axis 42 of the shaft 14. Thus, the amplitude of movement of the plate 29 can only be varied by removing the eccentric 39 therefrom and utilizing another eccentric, which has its center mounted a different distance from the longitudinal axis 42 of the shaft 14.

Since the end 38 of the rod 31 is directly in contact with the eccentric 39 on the shaft 14, the frequency of the rod 31 is the same as the frequency of the cutting blade 10. This ensures that movement of both the cutting blade 10 and the rod 31 occurs at the same frequency.

It should be understood that a separate motor could be employed to reciprocate the rod 31 if desired. It would be necessary to drive both of the motors at the same speed in order to ensure that the desired phase relationship between the cutting blade 10 and the rod 31 is maintained.

While the holddown foot of the present invention has been described with respect to a reciprocating cutting blade of the type shown and described in the aforesaid Sederberg application, it should be understood that the holddown foot of the present invention may be readily utilized with any material cutting machine having a cutting blade. Of course, it might be necessary to utilize a separate motor to reciprocate the plate 29.

An advantage of this invention is that it ensures that true cutting in each of the layers of material occurs in accordance with the desired pattern. Another advantage of this invention is that it prevents humping of the material being cut.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What I claim is:

1. A material cutting machine comprising:
 means to support material thereon for cutting;
 cutting means to cut the material supported on said material-supporting means;
 means to engage the top of the material to exert a downward force thereon;
 means to reciprocate said engaging means relative to the material when said cutting means is in cutting engagement with the material;
 second means to reciprocate said cutting means whereby said cutting means cuts during movement in both directions;
 and said reciprocating means for said engaging means having means controlled by said second reciprocating means to reciprocate said engaging means in the opposite direction to the reciprocation of said cutting means.

2. A material cutting machine comprising:
 means to support material thereon for cutting;
 cutting means to cut the material supported on said material-supporting means;
 means to engage the top of the material to exert a downward force thereon;
 means to reciprocate said engaging means relative to the material when said cutting means is in cutting engagement with the material;
 motive means having a shaft;
 means to connect said shaft of said motive means to said cutting means to reciprocate said cutting means to produce cutting during movement of said cutting means in both directions;
 said shaft having an eccentric mounted thereon with its center disposed on the opposite side of the longitudinal axis of said shaft from said connecting means and diametrically disposed;
 and said reciprocating means for said engaging means having a follower connected to said engaging means and cooperating with the periphery of said eccentric to move said engaging means in the opposite direction to the direction of movement of said cutting means during reciprocation thereof.

3. The machine according to claim 2 including:
 resilient means acting on said follower to maintain said follower in engagement with the periphery of said eccentric.

4. The machine according to claim 2 in which:
 said engaging means comprises a substantially flat, circular plate engaging the material and surrounding said cutting means;
 and means to adjustably connect said plate to said follower in accordance with the total thickness of the material being cut.

5. The machine according to claim 1 in which said engaging means surrounds said cutting means.

UNITED STATES PATENT OFFICE
CERTIFICATE OF CORRECTION

Patent No. 3,589,225      Dated June 29, 1971

Inventor(s) James G. Wiatt

It is certified that error appears in the above-identified patent and that said Letters Patent are hereby corrected as shown below:

Column 1, lines 11, 20, 26, 29, 30, 36, 38, 44, 47, 49, 55 and 57, "holddown", each occurrence, should read -- hold down --; line 18, cancel the "hyphen"; line 45, after "material", second occurrence, insert -- may occur. Humping of the material --; line 71, cancel the "hyphen". Column 2, lines 4, 11, 16, 19, 21 and 56, "holddown", each occurrence, should read -- hold down --; line 20, cancel the "hyphen"; line 34, cancel the "exclamation mark"; line 73, cancel the "hyphen". Column 3, line 28, cancel the "hyphen", first occurrence; line 30, "setscrew" should read -- set screw --; line 46, cancel "to prevent it from being lifted"; line 47, cancel "during the cutting of the material 24"; line 69, "holddown" should read -- hold down --. Column 4, line 2, "holddown" should read -- hold down --; lines 21 and 37, cancel the "hyphen", each occurrence.

Signed and sealed this 23rd day of May 1972.

(SEAL)
Attest:

EDWARD M. FLETCHER, JR.
Attesting Officer

ROBERT GOTTSCHALK
Commissioner of Patents